United States Patent
Hsu et al.

(10) Patent No.: US 8,057,042 B2
(45) Date of Patent: *Nov. 15, 2011

(54) STEREO PROJECTION OPTICAL SYSTEM USING LCD TO SEPARATE LEFT AND RIGHT EYE IMAGES

(75) Inventors: Chien-Wen Hsu, Taipei Hsien (TW); Chia-Hung Kao, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 623 days.

This patent is subject to a terminal disclaimer.

(21) Appl. No.: 11/952,979

(22) Filed: Dec. 7, 2007

(65) Prior Publication Data

US 2009/0103051 A1 Apr. 23, 2009

(30) Foreign Application Priority Data

Sep. 25, 2007 (CN) .......................... 2007 1 0201840

(51) Int. Cl.
*G03B 21/00* (2006.01)
(52) U.S. Cl. ................. 353/8; 353/20; 353/34; 359/465
(58) Field of Classification Search .................. 353/6–8, 353/20, 31, 33, 34, 81; 359/483, 487, 488, 359/495, 500, 464, 465; 349/25, 27, 30; 348/751, 51, 54, 57, 58
See application file for complete search history.

(56) References Cited

U.S. PATENT DOCUMENTS

| | | | |
|---|---|---|---|
| 4,461,541 A * | 7/1984 | Duthie | 359/465 |
| 4,995,718 A * | 2/1991 | Jachimowicz et al. | 353/31 |
| 5,815,221 A | 9/1998 | Kojima et al. | |
| 5,933,127 A * | 8/1999 | DuBois | 345/87 |
| 6,183,090 B1 * | 2/2001 | Nakanishi et al. | 353/20 |
| 6,513,934 B1 * | 2/2003 | Okuyama | 353/31 |
| 6,522,351 B1 | 2/2003 | Park | |
| 6,666,556 B2 * | 12/2003 | Hansen et al. | 353/20 |
| 2002/0176053 A1 * | 11/2002 | Chuang et al. | 353/20 |
| 2003/0169376 A1 | 9/2003 | Ouchi et al. | |
| 2006/0044515 A1 * | 3/2006 | Suzuki | 353/20 |
| 2006/0055844 A1 * | 3/2006 | Mi | 349/96 |
| 2006/0197914 A1 * | 9/2006 | Robinson | 353/20 |
| 2007/0146880 A1 | 6/2007 | Bleha et al. | |
| 2009/0079885 A1 * | 3/2009 | Hsu et al. | 348/756 |

FOREIGN PATENT DOCUMENTS

TW 276836 B 3/2007

* cited by examiner

*Primary Examiner* — Thanh X Luu
*Assistant Examiner* — Francis M Legasse, Jr
(74) *Attorney, Agent, or Firm* — Altis Law Group, Inc.

(57) ABSTRACT

A stereo projection optical system includes an image assimilator and a transmission-type light modulator positioned to receive the emergent light of the image assimilator. The image assimilator is configured for superimposing spatial information on the incident light beam and emitting one of a first polarized light component and a second polarized light component. The transmission-type light modulator alternates between a dark state and a bright state. The stereo projection optical systems provide viewers three-dimensional images formed by two alternative polarized lights whose polarizations are perpendicular relative to each other utilizing the transmission-type light modulators.

17 Claims, 7 Drawing Sheets

Polarization of light beam for left eye

Polarization of light beam for right eye

Pulse signals

<RELATED ART>

STEREO PROJECTION OPTICAL SYSTEM USING LCD TO SEPARATE LEFT AND RIGHT EYE IMAGES

CROSS REFERENCE TO RELATED APPLICATION

This application is related to a co-pending U.S. patent application Ser. No. 11/947,086, entitled "STEREO PROJECTION OPTICAL SYSTEM", which was filed on Nov. 29, 2007 and is assigned to the same assignee as the present application. The disclosure of the above-identified application is incorporated herein by reference.

RELATED FIELD

The present invention relates generally to projection optical systems, and more specifically to a stereo projection optical system.

BACKGROUND

Figure 6:
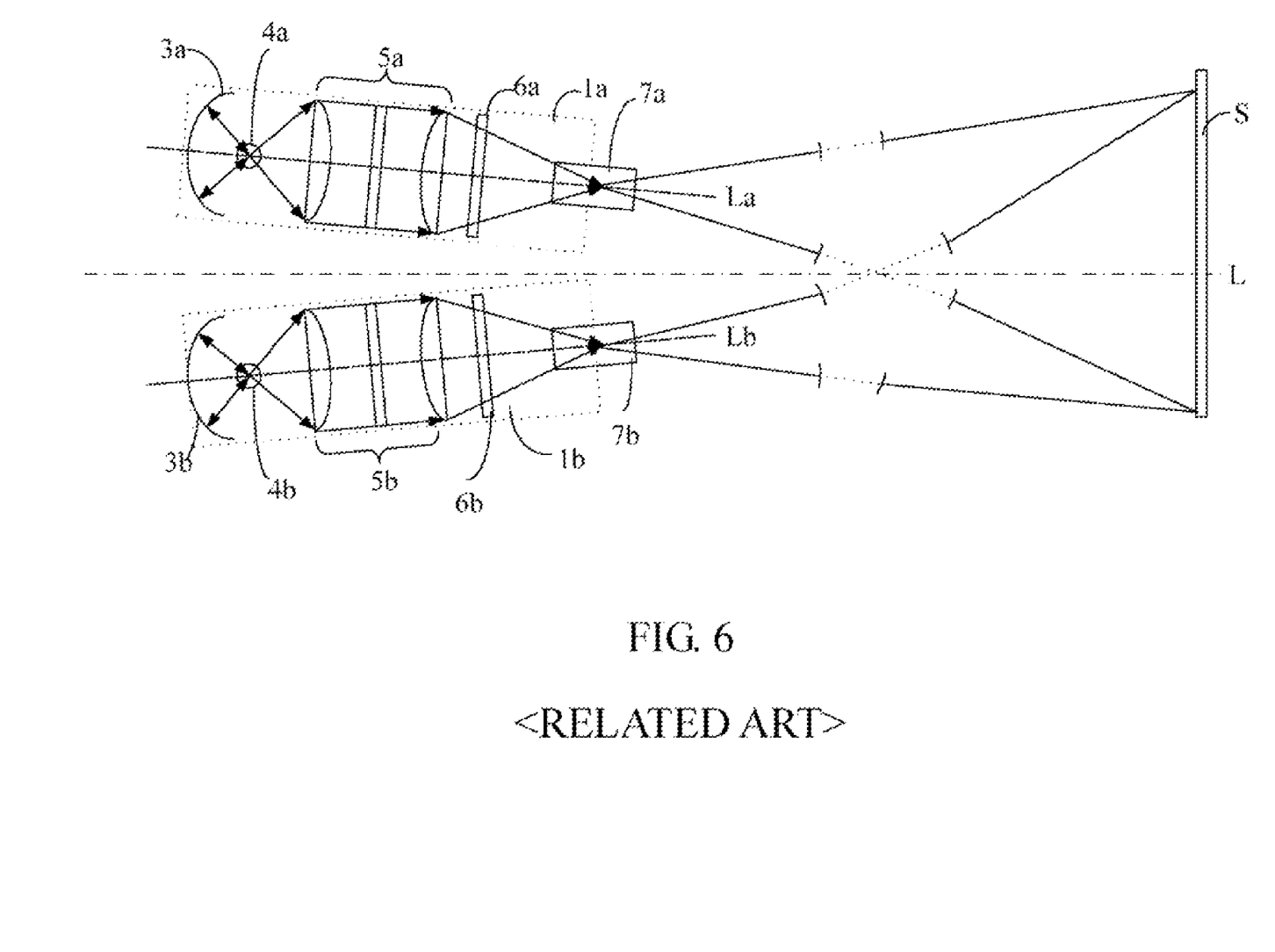
FIG. 6 illustrates a block diagram of a configuration of a convention stereoscopic projector in accordance with a prior art.

Conventional stereoscopic image projectors, as shown in FIG. 6, generally includes image-projecting units 1a, 1b each of which includes lamps 4a and 4b, spherical reflecting mirrors 3a and 3b, focusing lens devices 5a and 5b, LCD (Liquid Crystal Display) panels 6a and 6b, and projecting lenses 7a and 7b. The units 1a and 1b are individually driven, in order to match two images and thus produce a stereoscopic image on a screen S. Specifically, producing a focused image from one unit 1a on the screen S to produce a distinct image, and then moving the unit 1b vertically and laterally to produce another image focused overlapping the image from the unit 1b on the screen S to create the stereoscopic effect.

Figure 7:
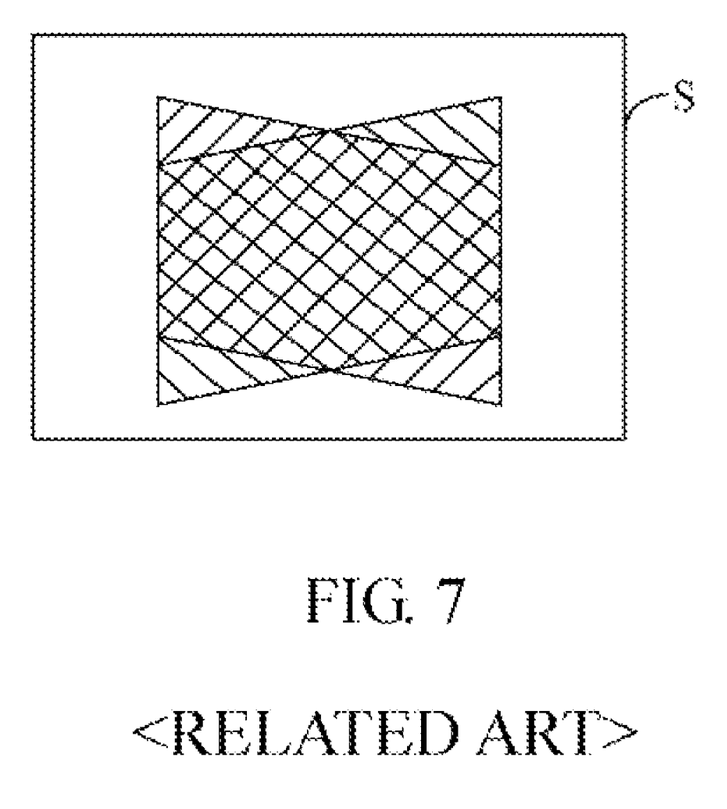
FIG. 7 is a schematic view of images distorted due to the keystone phenomenon generated in using a conventional stereoscopic projector of FIG. 6.

In such a conventional stereoscopic projector, however, optical axes La and Lb of the units 1a and 1b are inclined at a certain angle with respect to the central axis L of screen S, so that left and right images on the screen S are projected in the shape of a trapezoid as shown in FIG. 7. Thereby a keystone phenomenon occurs with the result that the two images are not completely matched in the overlapping arrangement, and thereby distorted. Consequently, such a conventional projector has a disadvantage of increasing the fatigue of viewer's eyes. In addition, there is a disadvantage that matching images on the screen S becomes troublesome and inconvenient, because two image projecting units 1a and 1b are individually driven and adjusted.

It is desired to provide a stereo projection optical system which can overcome the above-described deficiencies.

SUMMARY

In according with a present embodiment, a stereo projection optical system includes an image assimilator and a transmission-type light modulator positioned to receive the emergent light of the image assimilator. The image assimilator is configured for superimposing spatial information on the incident light beam which comprises a first polarized light component and a second polarized light component which is substantially orthogonal to the first polarized light component, and emitting one of a first polarized light component and a second polarized light component having spatial information. The transmission-type light modulator switchably operates between a dark state and a bright state. When the transmission-type light modulator is in the dark state, it directly transmits the first light component. When the transmission-type light modulator is in the bright state, it converts the first polarized light component into the second polarized light component and emits the second polarized light component.

Other novel features and advantages will become more apparent from the following detailed description when taken in conjunction with the accompanying drawings.

BRIEF DESCRIPTION OF THE DRAWINGS

The present invention is described in detail hereinafter, by way of example and description of preferred and exemplary embodiments thereof and with reference to the accompanying drawings, in which.

DETAILED DESCRIPTION OF THE PREFERRED EMBODIMENTS

A detailed explanation of a stereo projection optical system for projection displays according to each of various embodiment of the present invention will now be made with reference to the drawings attached hereto.

Figure 1:
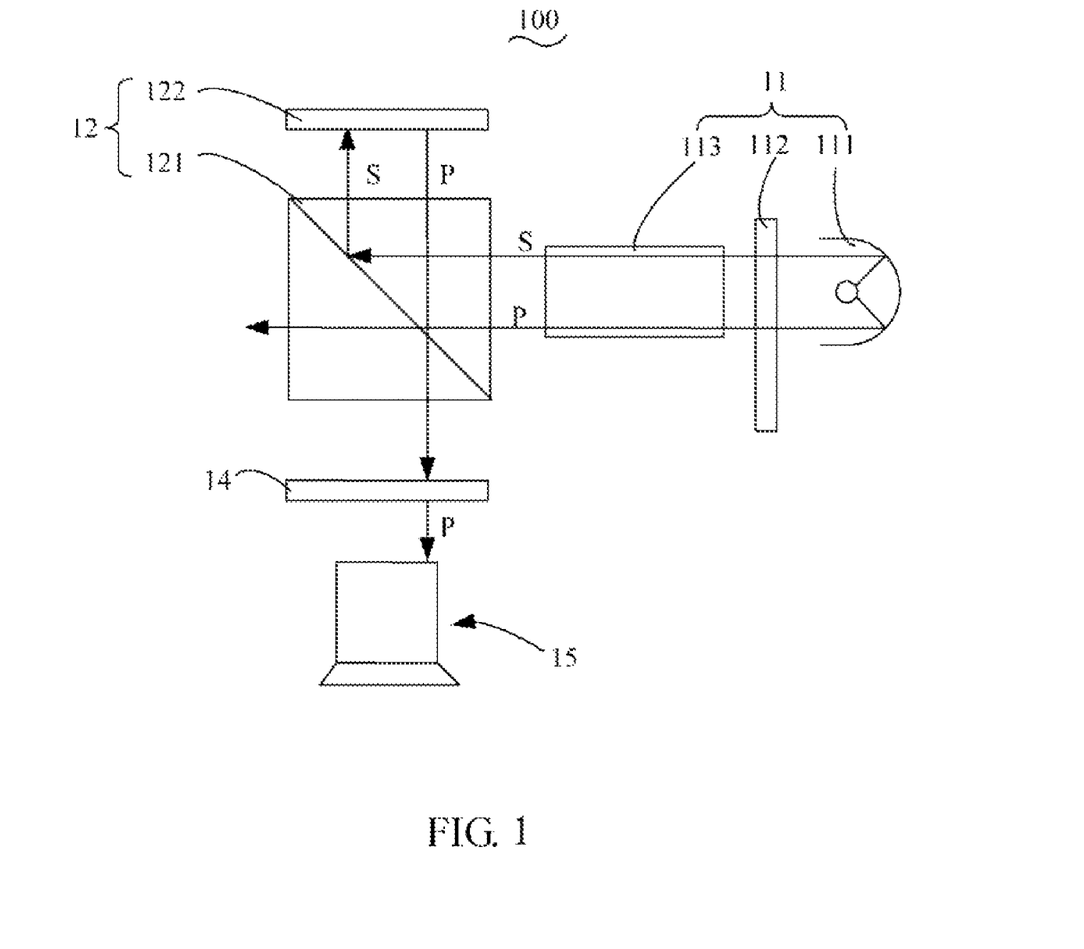
FIG. 1 is a schematic view of a configuration of a stereo projection optical system in accordance with a first embodiment of the present invention, wherein a transmission-type light modulator is in a light state.
Figure 2:
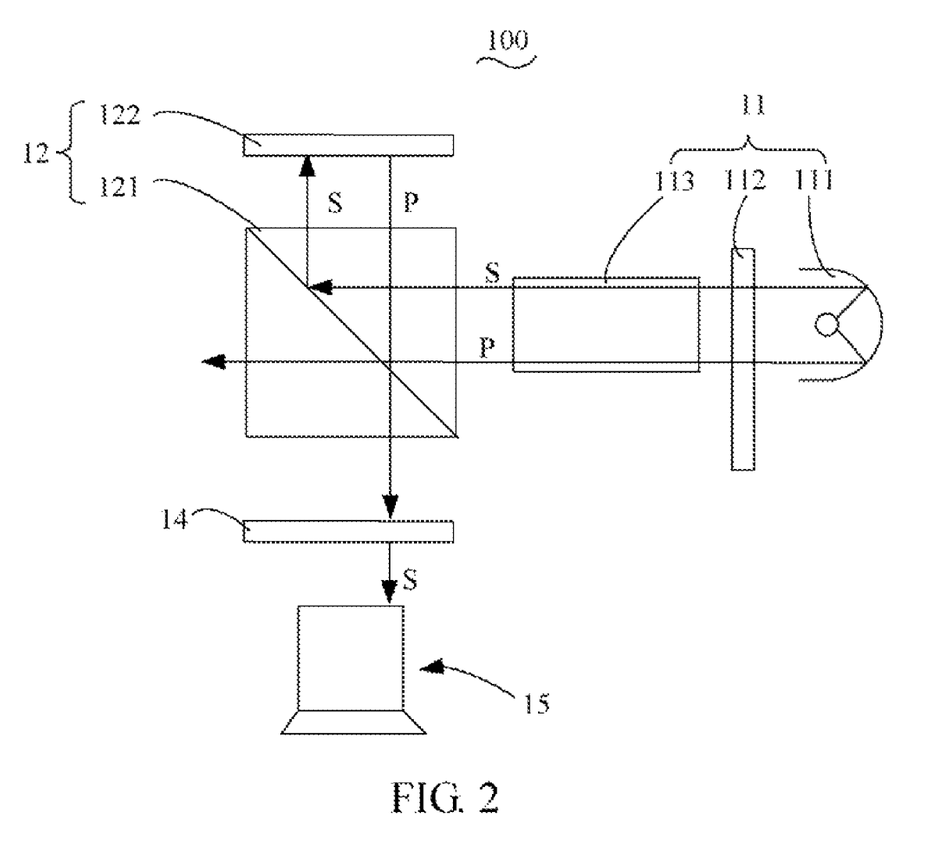
FIG. 2 is a schematic view of the stereo projection optical system of FIG. 1, wherein the transmission-type light modulator is in a dark state.

Referring to FIG. 1 and FIG. 2, a stereo projection optical system 100 in accordance with a first embodiment of the present invention is shown. The stereo projection optical system 100 includes a light source assembly 11, an image assimilator 12, a transmission-type light modulator 14, and a projecting lens 15.

The light source assembly 11 includes a light source 111, a color wheel 112 positioned to receive light of the light source 111, and a integrator 113 positioned to receive the light emerging form the color wheel 112. The light source 111 can be a halogen lamp, a metal halogen lamp, a light emitting diode (LED), and the like. In the present embodiment, the light source 111 is a halogen lamp. The color wheel 112 is configured for splitting the light output from the light source 111 into time-sequenced red, green and blue light beams. The color wheel 112 includes red, green and blue color filters, and the center of the color wheel 112 is connected to a motor (not shown) such that the color wheel 112 is rotated. The integrator 113 is configured for processing the light emitted from the color wheel 112 such that light beams exiting the integrator 113 have a uniform spatial distribution.

The image assimilator 12 is positioned to receive a light emerging from the light source assembly 11 and includes a polarizing beam splitter (PBS) 121 and a reflection-type spatial light modulator 122 offset from one other along an optical path. The PBS 121 is configured for splitting the non-polarized light from the light source assembly 11 into a first polarized light component and a second polarized light component which is substantially orthogonal to the first polarized light component. The first polarized light component can be S-polarized light or P-polarized light. When the first polarized light component is S-polarized light, the second polarized light component is P-polarized light. In the present embodiment, the first polarized light component is S-polarized light, and the second polarized light component is P-polarized light. The first polarized light component is reflected sideway by the PBS 121 and the second polarized light component passes directly through the PBS 121. The PBS 121 can be a wire grid polarizer (WGP) or a polarizing beam splitter prism. In the present embodiment, the PBS 121 is a polarizing beam splitter prism.

The reflection-type spatial light modulator 122 can be a liquid crystal on silicon (LCoS) and can be disposed in light path of the first polarized light component or the second polarized light component from the PBS 121. In the first embodiment, the reflection-type spatial light modulator 122 is disposed in the light path of the first polarized light component and is configured for converting the first polarized light component in a predetermined manner into the second polarized light component and superimposing spatial information on the second polarization light component. The modified second polarized light component is reflected by the reflection-type spatial light modulator 121 to the PBS 121 and further passes directly through the PBS 121 to the transmissive-type light modulator 14.

Figure 3:
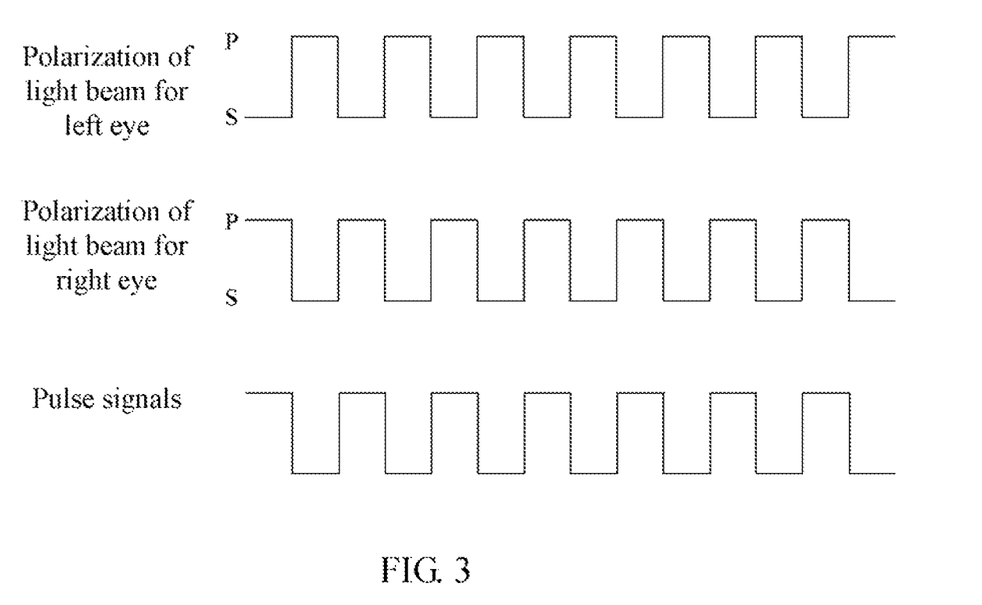
FIG. 3 is wave diagram of a pulse signal input into the transmission-type light modulator of FIG. 1 and polarizations of emergent light beams to form images for left and right eyes.

The transmission-type light modulator 14 is positioned to received the modified second polarized light component from the image assimilator 12 and can be a liquid crystal panel. The transmission-type light modulator 14 is controlled to turn on and off by pulse signals input into the transmission-type light modulator 14. Referring to FIG. 3, the pulse signals input into the transmission-type light modulator 14 are shown. The transmission-type light modulator 14 switchably operates between a dark state and a bright state under the control of the pulse signals and emits the first polarized light component and the second polarized light component alternatively to produce stereoscopic images for left and right eyes of viewer, as shown in FIG. 3. When the transmission-type light modulator 14 is in bright state, as shown in FIG. 1, the second polarized light component passes directly through the transmission-type light modulator 14 with substantially no change in polarization. Otherwise, when the light modulator 14 is in dark state, as shown in FIG. 2, the second polarized light component is converted into the first polarized light component and the first polarized light component is emitted from the light modulator 14. In this manner, left-eye and right-eye images are formed and then projected onto a screen (not shown) in an alternating manner. When the frequency of alternation is sufficiently fast, the left-eye and right-eye images may appear to a viewer as a single stereographic image.

The projecting lens 15 is configured for receiving the light output of the transmission-type light modulator 14 and magnifying and projecting an image formed the light output on a screen (not shown).

Figure 4:
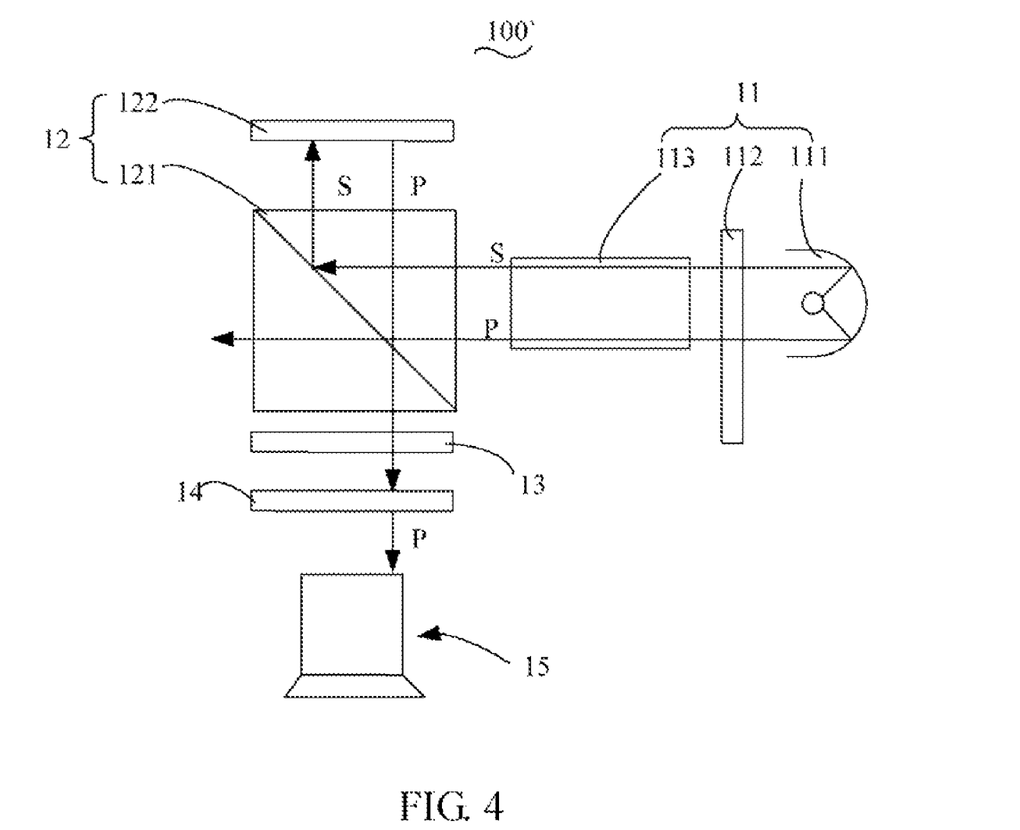
FIG. 4 is similar to FIG. 1, but further illustrates an analyzer disposed in the stereo projection optical system.

It should be understood that the stereo projection optical system 100 can also include an analyzer 13 in order to promote contrast of images projected by the stereo projection optical system 100. Referring to FIG. 4, this shows an analyzer 13 incorporated in a stereo projection optical system 100. The analyzer 13 can be a polarizer, which is configured for transmitting light of a predetermined polarization direction and removing light of other polarization direction depending on the characteristics of the analyzer 13. In the present embodiment, the analyzer 13 transmits P-polarized light and removes S-polarized light. The analyzer 13 is disposed between the image assimilator 12 and the transmissive-type light modulator 14.

Figure 5:
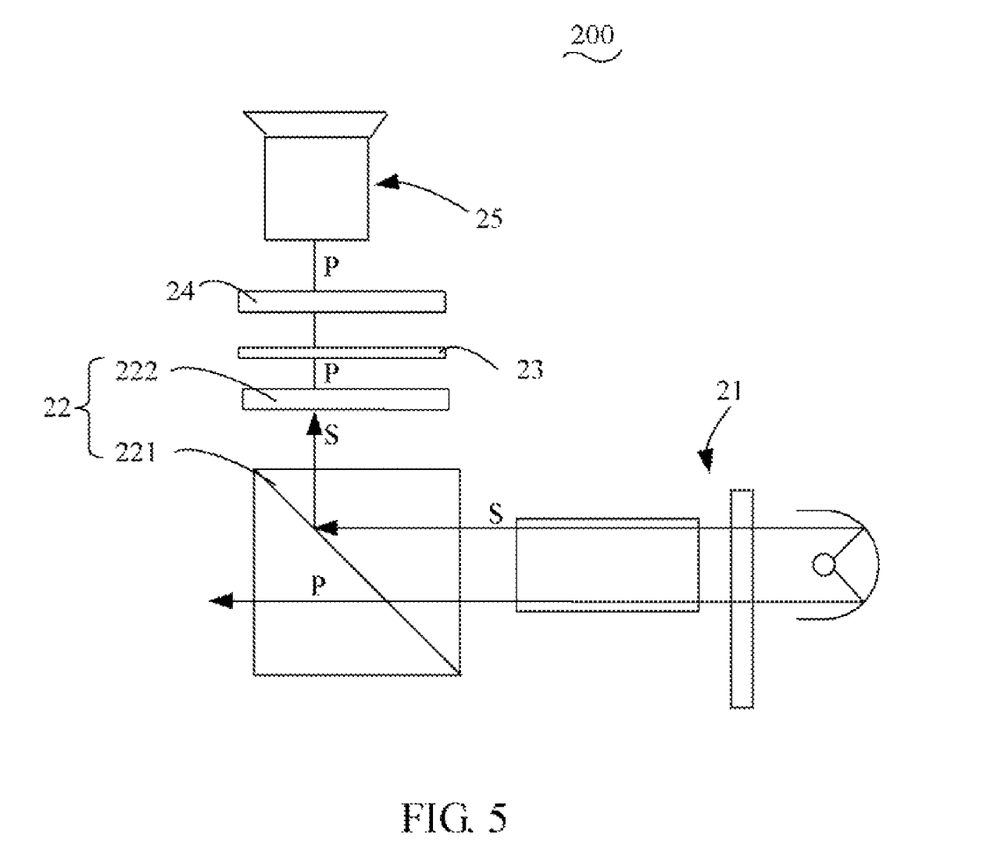
FIG. 5 illustrates a configuration of a stereo projection optical system in accordance with a second embodiment of the present invention.

Referring to FIG. 5, a stereo projection optical system 200 according to a second embodiment of the present invention is shown. The stereo projection optical system 200 includes a light source assembly 21, an image assimilator 22, an analyzer 23, a transmission-type light modulator 24, and a projecting lens 25.

Difference between the first embodiment and the second embodiment is that the image assimilator 22 includes a PBS 221 and transmission-type spatial light modulator 222 offset from one other along an optical path. The transmission-type spatial light modulator 222 can be a liquid crystal display (LCD) and is configured for rotating the polarization state of incident light beams to the corresponding orthogonal state and superimposing spatial information on the incident light beams and emits the modified polarized light. Other optical elements and light paths in the stereo projection optical system 200 are substantially same as that of the first embodiment.

The stereo projection optical systems provide viewers three-dimensional images formed by two alternative polarized lights whose polarizations are vertical perpendicular to each other utilizing the transmission-type light modulators. Accordingly, driving or adjustment of the stereo projection optical system can be easily and accurately carried out, so that the generation of keystoning phenomenon can be avoided, thereby providing an advantage of eliminating the fatigue of viewer's eyes in viewing the three-dimensional images.

It can be understood that the above-described embodiment are intended to illustrate rather than limit the invention. Variations may be made to the embodiments and methods without departing from the spirit of the invention. Accordingly, it is appropriate that the appended claims be construed broadly and in a manner consistent with the scope of the invention.

What is claimed is:

1. A stereo projection optical system, comprising:
   an image assimilator configured for separating an incident light into a first polarized light component and a second polarized light component which is substantially orthogonal to the first polarized light component and which travels in a path different from that of the first polarized light component and superposes spatial information on the first polarized light component; and
   a liquid crystal display positioned to receive the first polarized light component carrying the spatial information from the image assimilator, the liquid crystal display switchably operating between a dark state in which the liquid crystal display directly transmits the first light component therethrough and a bright state in which the liquid crystal display rotates the polarization direction of the first polarized light component into the polarization direction of the second polarized light component.

2. The stereo projection optical system as claimed in claim 1, wherein the image assimilator includes a polarizing beam splitter and a reflective spatial light modulator offset from one other along an optical path.

3. The stereo projection optical system as claimed in claim 1, wherein the image assimilator includes a polarizing beam splitter and a transmission-type spatial light modulator offset from one other along an optical path.

4. The stereo projection optical system as claimed in claim 1, wherein the first polarized light component is one of S-polarized light and P-polarized light.

5. The stereo projection optical system as claimed in claim 1, further comprising a projection lens positioned to receive the light emerging from the liquid crystal display and configured for magnifying and projecting an image.

6. The stereo projection optical system as claimed in claim 1, further comprising an analyzer disposed between the image assimilator and the liquid crystal display.

7. The stereo projection optical system as claimed in claim 1, further comprising a light source assembly, the light source assembly comprising:
   a light source for emitting light;
   a color wheel positioned to receive the light of the light source and spilt the light of the light source into time-sequenced red, green, and blue light beams; and
   an integrator positioned to receive the time-sequenced red, green, and blue light beams and uniform the time-sequenced red, green, and blue light beams as the incident light.

8. The stereo projection system as claimed in claim 1, wherein the second polarization light component is out of a light path of the first polarization light component through the liquid crystal display.

9. The stereo projection optical system as claimed in claim 2, wherein the polarizing beam splitter is a wire grid polarizer.

10. The stereo projection optical system as claimed in claim 2, wherein the polarizing beam splitter is a polarizing beam splitter prism.

11. The stereo projection optical system as claimed in claim 2, wherein the reflective spatial light modulator is a liquid crystal on silicon.

12. The stereo projection optical system as claimed in claim 3, wherein the polarizing beam splitter is a wire grid polarizer.

13. The stereo projection optical system as claimed in claim 3, wherein the polarizing beam splitter is a polarizing beam splitter prism.

14. The stereo projection optical system as claimed in claim 3, wherein the transmission-type spatial light modulator is a liquid crystal display.

15. The stereo projection optical system as claimed in claim 6, wherein the analyzer is a polarizer.

16. The stereo projection optical system as claimed in claim 15, wherein the polarizer directly faces the liquid crystal display and is configured for removing light of polarization direction other than that of the first polarized light component from incident light of the liquid crystal display.

17. A stereo projection optical system, comprising:
   a light source assembly configured for generating time-sequenced red, green, and blue light beams;
   an image assimilator positioned to receive the time-sequenced red, green, and blue light beams, spit the time-sequenced red, green, and blue light beams into a first polarization light component and a second polarization light component which is substantially orthogonal to the first polarized light component and which travels in a path different from that of the first polarized light component and superposes spatial information on the first polarized light component;
   a liquid crystal display positioned to receive the first polarized light component carrying the spatial information from the image assimilator, the liquid crystal display switchably operating between a dark state in which the liquid crystal display directly transmits the first light component therethrough and a bright state in which the liquid crystal display rotates the polarization direction of the first polarized light component into the polarization direction of the second polarized light component; and
   an analyzer placed in front of the liquid crystal display to remove light of polarization direction other than that of the first polarization light component ensure that the second polarization component is out of the liquid crystal display.

\* \* \* \* \*